United States Patent Office 2,732,317
Patented Jan. 24, 1956

2,732,317

MODIFIED CELLULOSE AND METHOD OF MAKING SAME

James Emory Kirby, Wilmington, Del., assignor to E. I. du Pont de Nemours and Company, Wilmington, Del., a corporation of Delaware No Drawing. Application July 8, 1952,
Serial No. 297,765

15 Claims. (Cl. 117—63)

This invention relates to a new process for modifying cellulose and also to the modified celluloses thereby obtained.

Cellulose in its various forms, e. g., cotton, rayon, cellophane and the like, has been a major article of film and fiber commerce for a long time, primarily due to the desirable combination of properties it possesses, e. g., low cost, ready availability, reasonably good physical properties, and a hydrophilicity adequate for many purposes, e. g., such as to facilitate dyeing and processing in aqueous systems. Many processes have been developed over the years for modifying cellulose, e. g., to basify it, to strengthen it, to make it water resistant, and the like. However, no process for increasing the already relatively high hydrophilicity of cellulose has hitherto been suggested that does not result in a decrease in its other properties.

Many of the processes heretofore suggested for the modification of cellulose materials having at least one dimension relatively attenuated, for instance, treatments to improve antistatic properties, sizing to improve milling and weaving characteristics, filling to improve hand and feel and the like, involve the treatment of cellulose with vinylidene polymers, either in solution or dispersion, or alternatively by treatment with the requisite monomer followed by polymerization. Such processes, while admittedly modifying the cellulose to change its physical properties in one or more ways, involve external deposition of the vinylidene polymer to a major degree and result in no increase of hydrophilicity. Usually the reverse is the case and these modifications appreciably alter the desirable over-all characteristics of the cellulose in one or more ways, e. g., they have tended to increase stiffness.

Recently many synthetic films and fibers have been introduced and have rapidly developed into commercial products of large and expanding markets, primarily because of their extremely good physical properties, particularly their increased strength and wear resistance as compared with the natural, or modified natural, film- and fiber-forming materials. However, these new synthetic polymers as a class are deficient in hydrophilicity, i. e., moisture regain. This property is highly important since the various processing steps conventionally used in the film and fiber industries, such as weaving, sizing, dyeing, etc., and even, in some cases, the initial spinning or casting stage, are carried out in aqueous systems. Thus, despite the present great utility of the synthetic polymers these would have extended fields of utility were their hydrophicility to be increased without deleteriously affecting their other desirable physical properties.

Various attempts have been made to attain this goal perhaps the most important of which, as judged from the cost standpoint, is that wherein the synthetic polymer is blended with cheaper and more hydrophilic materials of which the most available is, of course, cellulose in its various forms. However, despite the relatively good hydrophilic characteristics of cellulose, it has been found that such high proportions thereof have to be used to produce the desired improvement in hydrophilic characteristics as to detract appreciably from the superior physical characteristics contributed by the synthetic polymers with the result that the end products are not as strong as is desired.

This invention has an object the preparation of cellulose objects of improved hydrophilicity. A further object is the preparation of such objects in a shaped form having one dimension extended but at least one dimension attenuated, i. e., films and fibers. Other objects will appear hereinafter.

These objects are accomplished by the process of the present invention wherein the cellulosic material in whatever desired form is immersed in a solution of a polymerizable vinylidene monomer containing a quaternary ammonium salt group, the anion of which is of molecular weight less than 150, said solution containing, also in solution, an initiator for the addition polymerization of said monomer, maintaining the solution at a temperature adequate for polymerization until the polymerization is attained and finally removing all surface polymer from the cellulose by careful and thorough extraction with a solvent for said polymer. Because of convenience, lower cost, greater safety, and the good solubility of most of these quaternary ammonium vinylidene monomers and polymers therein, water is usually used as a solvent for the monomer and as the stripping agent to remove surface polymer, the latter conveniently at the boil. The modified cellulose materials thus obtained containing solely internally deposited, non-extractable quaternary ammonium vinylidene polymer also constitute a part of this invention.

In the process of this invention the starting cellulose material can be preswollen or not. It is convenient not to have to preswell the cellulose, but for quicker and more thorough penetration of the cellulose by the vinylidene monomer, it is desirable to use preswollen cellulose where possible. The addition polymerization initiators used can be any of those known in the art, provided they are soluble in the solvents used at the concentrations necessary for initiating polymerization, such as the oxygen yielding initiators, e. g., the persulfates, benzoyl peroxide, with or without added reducing agents; the azo compounds, e. g., $\alpha,\alpha'$-azobis(isobutyramidine hydrochloride) and the like. The temperatures of polymerization can vary from 0° to 100° to 150° C. or higher or lower, depending, as is usual in the case of vinylidene polymerizations, on the particular nature of the monomer and initiator system being used. The final step, the critical one in the process, involves the complete removal from the surface of the treated cellulose of any vinylidene quaternary ammonium polymer by careful and thorough extraction with a solvent for the polymer, usually water at the boil. After such thorough solvent extraction which removes surface polymer, and which may extract from the interior of the cellulose polymer of low enough molecular weight to diffuse out, additional washings do not remove additional polymer, i. e., there is substantially no further weight loss. Phrased another way this means that the internally deposited quaternary ammonium vinylidene polymer is not extractable.

The treated celluloses containing the internally deposited quaternary ammonium vinylidene polymers not only exhibit appreciably improved moisture regain values but also are readily and easily dyed to deep shades with acid dyes, a property long sought for in previous modifications of cellulose. Furthermore, the treated celluloses not only exhibit higher moisture regain figures than controls but lose the absorbed water at a much slower rate on air drying, a property of high importance in many mill operations. Finally, the treated celluloses possess much improved antistatic properties, exhibiting, in certain instances, as much as an eight hundred-nine hundredfold improvement in this respect.

The process of this invention is of generic applicability to those polymerizable, solvent-soluble quaternary ammonium salts whose polymerizability is due to a single ethylenic unsaturation, usually a terminal ethylenic group. The anion of this monomeric salt, as mentioned previously, is of molecular weight less than 150 and is generally that of one of the simple organic or inorganic mono-, di- or tribasic acids, preferably the mono- or dibasic acids, provided only that the quaternary ammonium monomer is solvent-soluble. The single terminal ethylenic unsaturation in these vinylidene monomers is bonded through a carbon chain of at least one carbon which can contain etheroxy, carboxyester or carbonamide interruptions to the quaternary ammonium nitrogen, one valence of which is singly ionically linked in multiples of one to three to the anion of a simple acid and any remaining valences of which are satisfied by organic radicals, preferably free of Zerewitinoff active hydrogen.

The following examples in which parts are by weight are illustrative of the invention.

EXAMPLE I

A 1.468 part skein of textile rayon yarn is wet out with water and immersed in 42 parts of a 28.6% aqueous solution of $\beta$-methacrylyloxyethyltrimethylammonium methylsulfate containing 0.1 part $\alpha,\alpha'$-azobis(isobutyramidine hydrochloride). After standing for one hour at room temperature to permit complete penetration of the solution into the cellulose, the skein is removed and allowed to drain for one minute. It is then placed in a tightly capped bottle and heated at 70° C. for 16 hours to effect polymerization. At the end of this time, the skein is removed and placed in boiling water for one hour to remove surface polymer. The resulting semigelatinous yarn is partly dehydrated with methanol and dried at 70° C. under reduced pressure. There is obtained 2.918 parts of soft, dry yarn, a gain in weight of 98.8%. Two additional skeins treated in like manner show weight gains of 109 and 115%. The yarn containing 98.8% of internally deposited poly-$\beta$-methacrylyloxyethyltrimethylammonium methylsulfate has a denier of 298 compared with 151 for the original and shows a moisture regain at 97% humidity of 75.8% compared to 38.9% for the original.

EXAMPLE II

A series of textile rayon yarns is treated as described in Example I with varying concentration of $\beta$-methacrylyloxyethyltrimethylammonium methylsulfate. The weight gain due to internally deposited polymer after washing off surface polymer is given in the following table:

| Yarn | Percent Monomer in Treating Soln. | Percent Weight Gain |
| --- | --- | --- |
| 1 | 60 | 90.2 |
| 2 | 40 | 48.5 |
| 3 | 20 | 18.3 |
| 4 | 16.7 | 16.6 |
| 5 | 11.8 | 10.8 |
| 6 | 9.1 | 8.3 |

All these yarn samples exhibited improved moisture regain values compared to the control yarn.

EXAMPLE III

A 0.905 part skein of textile rayon yarn is placed in 15 parts of an 80% aqueous solution of N,N-dimethyl-N-beta - methacrylyloxyethyl - beta - propiobetaine containing 0.05 part $\alpha,\alpha'$-azobis(isobutyramidine hydrochloride). The yarn and solution are heated at 70° C. for 16 hours to effect polymerization. On washing off surface polymer and drying as described in Example I, there is obtained 1.631 parts of dry yarn, representing an 80.5% weight gain due to internally deposited poly-dimethyl-beta - methacrylyloxyethyl - beta - propiobetaine, which exhibits an appreciably higher moisture regain than the control yarn.

EXAMPLE IV

A. *Preparation of pentachlorobenzyl bromide*

To a hot solution of 6.6 parts of pentachlorotoluene in 80 parts of carbon tetrachloride is added 4.9 parts (10% excess) of N-bromosuccinimide freshly crystallized from water and 0.1 part of benzoyl peroxide and the reaction mixture heated at the reflux for one hour. The resultant precipitate of succinimide is removed by filtration and the carbon tetrachloride is allowed to evaporate from the filtrate at room temperature. After recrystallizing the resultant solid residue from ethanol, there is obtained 4.7 parts (54% of theory) of pentachlorobenzyl bromide in the form of white needles melting at 114–5° C.

B. *Preparation of $\beta$-methacrylyloxyethyldimethylpentachlorobenzylammonium bromide*

To a solution of 25 parts of the above pentachlorobenzyl bromide in 72 parts of methyl ethyl ketone is added a solution of 11.5 parts of freshly distilled dimethylaminoethyl methacrylate in 11 parts of methyl ethyl ketone. There is an immediate separation of the solid quaternary ammonium salt. The reaction mixture is stirred for thirty minutes after addition of the amine. The salt is filtered, washed with acetone and air-dried. There is obtained 32 parts (87% of theory) of non-hygroscopic $\beta$ - methacrylyloxyethyldimethylpentachlorobenzylammonium bromide as a white, crystalline solid.

C. *Preparation of a $\beta$-methacrylyloxyethyltrimethylammonium methylsulfate/$\beta$-methacrylyloxyethyldimethylpentachlorobenzylammonium bromide copolymer internally deposited in cellulose fibers*

A 1.513 part skein of textile rayon yarn is immersed in a solution of 3.5 parts of $\beta$-methacrylyloxyethyltrimethylammonium methylsulfate, 4.5 parts (about a 0.75 molar proportion based on the methylsulfate monomer) of $\beta$ - methacrylyloxydimethylpentachlorobenzylammonium bromide and 0.05 part of $\alpha,\alpha'$-azobis(isobutyramidine hydrochloride) in 3.5 parts of water. After standing for 45 minutes at room temperature, the yarn skein is removed and allowed to drain for two minutes. It is then placed in a tightly stoppered bottle and heated at 70° C. for 16 hours to effect copolymerization. The resulting yarn is stiffened due to surface polymer which is removed by treating with boiling water for four hours. After partially dehydrating with methanol, the yarn is dried at 70° C. under reduced pressure. There is obtained 2.446 parts of yarn, a gain in weight of 61% due to internally deposited copolymer. This yarn exhibits not only greater moisture regain values but also greater resistance to burning than does control yarn. Thus, when held in a horizontal position and ignited, the flame is extinguished when the source of heat is removed; whereas, under like conditions, a sample of the untreated yarn continues to burn until completely consumed.

EXAMPLE V

Rayon staple, 1.219 parts, wrapped in cheese cloth, is immersed in 40 parts of a 30% aqueous solution of $\beta$-methacrylyloxyethyltrimethylammonium chloride containing 0.1 part $\alpha,\alpha'$-azobis(isobutyramidine hydrochloride.) After allowing one hour for the system to come to equilibrium, the staple is removed, drained for a few minutes and placed in a tightly stoppered bottle which is heated at 70° C. for 16 hours. After thorough washing with boiling water to remove surface polymer, the staple is dried at 70° C. under reduced pressure. There is thus obtained 1.703 parts of flexible, soft staple, corresponding to a 39.7% weight gain due to internally deposited poly-beta-methacrylyloxyethyltrimethylammonium chloride.

Treatment of rayon staple in like manner with the same concentration of beta-methacrylyloxyethyltrimethylammonium methylsulfate results in a weight gain of 31.2%. Both treated staples containing interior deposits of the quaternary ammonium polymers exhibit superior moisture regain values to those of untreated control samples.

EXAMPLE VI

Rayon broadcloth, 9.967 parts, is swollen with liquid ammonia, immersed in ice water for about 30 minutes to displace ammonia, and finally immersed and thoroughly rinsed free of any amonia in several changes of distilled water. The thus treated fabric is then placed in a polymerization reactor and covered with 120 parts of an aqueous 83.3% solution of beta-methacrylyloxyethyltrimethylammonium methylsulfate containing 0.1 part $\alpha,\alpha'$-azobis(isobutyramidine hydrochloride). The reactor is heated to 40° C. to effect polymerization and this temperature is maintained until no further increase in the viscosity of the solution is noted. The fabric is then removed, boiled with water to remove surface polymer, and dried. There is thus obtained 7.278 parts of soft fabric, corresponding to the internal deposition of 37% of poly-beta-methacrylyloxyethyltrimethylammonium methylsulfate. The treated broadcloth exhibits superior moisture regain values, antistatic properties, and resistance to flex abrasion.

Similar results are obtained under like conditions with various other type cellulose fabrics as given in the table below. In all instances the polymer referred to is internally deposited poly-beta-methacrylyloxyethyltrimethylammonium methylsulfate.

| Fabric | Percent Polymer | Percent Moisture Regain | | Static Propensity [1] | Flex Abrasion (cycles) |
|---|---|---|---|---|---|
| | | Initially | Air-dried 40 min. | | |
| Rayon Broadcloth | 37.0 | 87 | 14 | 5.2 | 344 |
| Do | 0.0 | 88 | 4 | 8,000.0 | 229 |
| Cotton Poplin | 29.0 | 55 | 24 | 1.7 | 1,169 |
| Do | 0.0 | 49 | 2 | 12,000.0 | |
| Unbleached Cotton Muslin | 25.0 | 99 | 20 | 13.5 | 380 |
| Cotton Twill | 17.7 | 75 | 55 | 3.0 | 725 |

[1] A measure of antistatic properties reported as resistivity in ohms×10⁸; the lower the figure the less the undesirable static effects.

EXAMPLE VII

A 2.837 part portion of cellophane film is swollen with water, placed in a polymerization reactor, and covered with 250 parts of a 30% aqueous solution of beta-methacrylyloxyethyltrimethylammonium methylsulfate, containing 0.1 part $\alpha,\alpha'$-azobis(isobutyramidine hydrochloride). After standing for three hours at room temperature, the reactor is warmed to about 40° C. to initiate polymerization. When the solution begins to become viscous, the source of heat is removed and the system is allowed to stand at room temperature for 16 hours. The film is washed with methanol, then water and finally dried. There is thus obtained 4.379 parts of clear, flexible film corresponding to the internal deposition within the film of 54.5% poly-beta-methacrylyloxyethyltrimethylammonium methylsulfate. The treated film exhibits a superior moisture regain value to that of untreated control.

EXAMPLE VIII

A 0.913 part skein of rayon yarn is impregnated with a 20% aqueous solution of 1,2-dimethyl-5-vinylpyridinium methylsulfate containing a small amount of $\alpha,\alpha'$-azobis(isobutyramidine hydrochloride). The impregnated skein is then placed in a polymerization reactor, the reactor closed and the skein heated for 16 hours at 70° C. to effect polymerization. The yarn is then removed and thoroughly water-washed to dissolve surface polymer. After drying, there is thus obtained a 0.985 part skein of soft, white yarn corresponding to the internal deposition of 7.9% of poly-1,2-dimethyl-5-vinylpyridinium methylsulfate. The treated yarn exhibits a superior moisture regain as compared to untreated control samples.

EXAMPLE IX

A 1.071 part sample of cellulose sponge is placed in a polymerization reactor and covered with 100 parts of a 30% aqueous solution of beta-methacrylyloxyethyltrimethylammonium methylsulfate containing 0.05 part of $\alpha,\alpha'$-azobis(isobutyramidine hydrochloride) and the reactor closed. After being allowed to stand for ½ hour at room temperature, the reactor and its contents are heated at 70° C. for 2½ hours to effect polymerization. The sponge is then removed and thoroughly water-washed to dissolve surface polymer. After drying at 70° C., there is thus obtained 1.227 parts of cellulose sponge corresponding to the internal deposition of 14.6% of poly-beta-methacrylyloxytrimethylammonium methylsulfate. The treated sponge exhibits superior moisture regain values as compared to untreated control samples.

EXAMPLE X

A 0.888 part skein of rayon yarn is immersed in 15 parts of a 33% aqueous solution of beta-methacrylyloxyethyltrimethylammonium methylsulfate containing 0.1 part of potassium persulfate for one hour at room temperature. The skein is then removed from the solution and placed in a polymerization reactor. The reactor is closed and heated for 16 hours at 70° C. to effect polymeriaztion. The yarn is then removed and thoroughly water-washed to dissolve surface polymer. After drying, there is thus obtained 2.105 parts of soft, white yarn corresponding to the internal deposition of 137% of poly-beta - methacrylyloxyethyltrimethylammonium methylsulfate. The treated yarn exhibits greatly superior moisture regain values to those of untreated control yarns.

This invention is generic to modified celluloses containing appreciable quantities of solely internally deposited quaternary ammonium vinylidene polymers. These new modified celluloses are more hydrophilic in nature than the original cellulose but exhibit unchanged the desirable combination of physical properties of the original cellulosic material. These modified celluloses are obtained by polymerizing the quaternary ammonium vinylidene monomer or monomers involved in and on the cellulose and subsequently removing the externally deposited quaternary ammonium polymer. A convenient method for removing the externally deposited polymer due to the high water-solubility of most such quaternary ammonium polymers is that of simple water extraction, preferably at the boil because of the shorter times required. The polymerization is effected by simply immersing the desired form of cellulose, regenerated or not, e. g., fabric, yarn, staple, paper, film, sponge, flake and the like, in a solution, usually aqueous, of the particular quaternary ammonium vinylidene monomer or monomers desired containing dissolved addition polymerization initiator, heating to the requisite temperature to effect polymerization, and finally, carefully removing all surface polymer.

Any soluble addition polymerization initiator system can be used, usually the water-soluble ones, including the many known free radical generating systems, such as the peroxy and hydroperoxy compounds, whether or not an added reducing agent activator is present, i. e., the so-called redox systems. The water-soluble azo-type initiators, such as those described in detail in U. S. Patent 2,471,959, are preferred since the redox type initiator systems effect polymerization in general at too low a temperature. The temperature of polymerization can vary from 0–150° C. or higher depending, as is true of all addition polymerizations, on the particular nature of both the initiator system and the quaternary ammonium vinylidene monomer or monomers being used. For obvious considerations of equipment, degree of control possible, and convenience, it is preferred to use those initiator systems which operate with maximum effectiveness at temperatures ranging from room temperature to 100° C. and preferably from 40–80° C.

Although the aqueous monomer-initiator systems and aqueous extraction of surface polymer, the latter usually and conveniently at the boil, have been pointed out, and specifically illustrated in the examples, as preferred due to the outstanding water solubility of both the monomeric and polymeric quaternary ammonium vinylidene compounds involved in the products and processes of this invention, it is to be understood that other solvent based systems can be used. For instance, the cellulose materials can be treated with solutions of the requisite quaternary ammonium vinylidene monomer or monomers including minor amounts of other polymerizable vinylidene monomers, as pointed out later, in other inert solvents, such as: the lower alcohols, for instance, those of less than six carbons, particularly the lower monoalcohols, most particularly the lower tertiary monoalcohols, e. g., tert.butanol, and the like; the lower ketones, particularly the lower monoketones of no more than six carbons, e. g., methyl ethyl ketone, and most particularly the lower tertiary monoketones, e. g., methyl tert.butyl ketone; the lower nitriles, particularly the lower mononitriles of no more than six carbons, e. g., acetonitrile; and the like. Similar such solvents can be used to remove the surface deposited polymer. It is also to be understood that these various solvent systems for both the monomer or monomer/initiator combinations can be anhydrous but are preferably aqueous at levels of from 0–90% water.

This invention is generic to modified celluloses containing wholly internally deposited quaternary ammonium vinylidene polymers, including copolymers. A preferred class of the quaternary ammonium vinylidene monomers used are those wherein the single terminal vinylidene group, $CH_2=C<$, is bonded either directly or mediately through a negative, i. e., electron attractive group, including nuclear carbon of an aromatic heterocyclic ring, to the quaternary ammonium nitrogen. Generally speaking, these quaternary ammonium vinylidene monomers will contain only carbon, hydrogen, oxygen, the quaternary nitrogen and the elements of the quaternary ammonium anion. In the particularly preferred, because of readier availability, class of these quaternary monomers the single polymerizable terminal vinylidene group is joined to a quaternary ammonium nitrogen through a carbon, oxy-interruped carbon, or carboxy-interrupted carbon chain, with one valence of the said quaternary ammonium nitrogen being satisfied by a single ionic linkage to the anion of a simple, i. e., not complex, organic or inorganic acid, preferably strong and of molecular weight less than 150 and the remaining valences of the said quaternary nitrogen being satisfied by monovalent organic radicals preferably solely hydrocarbon free of aliphatic unsaturation and of no more than eight carbons each. It will be noted from this description of quaternary ammonium vinylidene monomers that in polymer form, as internally deposited in the modified celluloses of this invention, the quaternary ammonium groups will be present as extralinear components on and not in the said polymer chain.

The preferred quaternary ammonium vinylidene monomers are those wherein the single quaternary ammonium nitrogen is (a) that of an N-substituted pyridinium nucleus, hydrocarbon except for the pyridinium nitrogen and (b) a trihydrocarboammonium nitrogen which is bonded to the alkylene, —R— radical of a group, —(CO)$_n$OR—, wherein $n$ is a cardinal number not greater than one, which in turn is bonded either directly or through another alkylene —R— radical to the terminal vinylidene group. The quaternary ammonium vinylidene monomers used in preparing the modified celluloses of this invention thus each have a single quaternary ammonium nitrogen, one valence of which is bonded to the single terminal vinylidene group through a multiply bonded carbon, including the carbons of an aromatic ring such as the pyridinium ring, or through, either directly or mediately, an ether oxygen or an ester linkage, either as a carbonyl-oxy or oxy-carbonyl linkage. The said single quaternary ammonium nitrogen will have a further valence ionically bonded singly in multiples of one to three and usually one to two to an anion of a simple organic or inorganic acid, preferably a strong acid. The term simple acid is used as in the Rules for Inorganic Nomenclature in contrast to the polyacids. See, for instance, J. Am. Chem. Soc. 63, 889, et seq (1941). The remaining valences of the said single quaternary ammonium nitrogen are satisfied by organic radicals, preferably hydrocarbon radicals of one to eight carbons free of aliphatic unsaturation, two of which may be together joined to form with the said quaternary ammonium nitrogen a ring. Generally, these said remaining valences will be satisfied by solely hydrocarbon radicals having a total of three to twelve carbons, and most preferably by saturated aliphatic hydrocarbon radicals of a total of from two to six carbons with the lower (one to two carbon) saturated aliphatic hydrocarbon radicals being particularly preferred.

Particularly useful are those quaternary ammonium vinylidene monomers wherein the single quaternary ammonium nitrogen is singly ionically bonded as described above to the anion of a simple acid and singly to the sole vinylidene group through (a) an oxy-alkylene radical or (b) a carboxy-alkylene radical or (c) pyridinium ring carbon, any remaining valences of the nitrogen being satisfied by solely hydrocarbon radicals free of aliphatic unsaturation. Thus, in one class of the quaternary ammonium vinylidene monomers, the quaternary ammonium nitrogen is joined to the $C_nH_{2n}$ radical of a —(CO)$_m$OC$_n$H$_{2n}$— group wherein $m$ is a cardinal number not greater than one and $n$ is an integer from 1 to 6, with the remaining free valence of the said group being bonded directly or mediately through a divalent saturated aliphatic hydrocarbon radical to the single vinylidene group. In the other class, the quaternary ammonium nitrogen is that of a pyridinium nucleus, hydrocarbon except for the nitrogen, which is bonded from carbon of the pyridinium nucleus directly to the single vinylidene group. In both classes the remaining valences of the quaternary ammonium nitrogens are satisfied by monovalent hydrocarbon radicals free of aliphatic unsaturation and generally totaling no more than twelve carbons. These types of quaternary ammonium vinylidene monomers and polymers are generally well known in the art. See, for instance, U. S. Patents 2,138,763; 2,484,420; 2,484,430; 2,487,829; 2,540,985; 2,572,560; 2,572,561 and the copending applications of Barney Ser. No. 216,838, filed March 21, 1951, and Ser. No. 267,495, filed January 21, 1952, now Patent No. 2,677,699.

Particular examples of these various quaternary ammonium vinylidene monomers include those of the vinyl pyridinum type such as: 1-methyl-2-ethyl-5-vinylpyridinium methylsulfate, 1-ethyl-2-vinylpyridinium chloride, 1-methyl - 5 - ethyl-2-vinylpyridinium-p-toluenesulfonate, 1-benzyl-5-ethyl-4-vinylpyridinium bromide; those wherein the quaternary ammonium nitrogen is bonded to the vinylidene group through an alkylene ether linkage such as: beta-vinyloxyethyltrimethylammonium chloride, beta-vinyloxyethyldiethylbenzylammonium bromide, gamma-vinyloxypropyltrimethylammonium methylsulfate; those wherein the quaternary ammonium nitrogen is bonded to the single vinylidene group through an alkylene carboxy ester or alkylene carboxy ester alkylene linkage including both the oxy-carbonyl and carbonyl-oxy types of carboxy ester linkages such as: beta-acrylyloxyethyltrimethylammonium chloride, gamma-methacrylyloxypropylbenzylethylmethylammonium methylsulfate, 4-(alphaethylacrylyloxy)cyclohexylmethylbutylammonium p-toluenesulfonate and the like. In the case of homopolymers of the quaternary ammonium vinylidene monomers wherein the vinylidene group is bonded to the quaternary nitrogen through an ether linkage polymerization initators of the ionic type are preferred. Minor amounts of other addition polymerizable monomers, preferably those containing a single vinylidene group, can be used in preparing the new products of this invention, such as the vinylidene carboxylic acids and their ester, amide, nitrile, and other derivatives, e. g., acrylic acid, methacrylamide, acrylonitrile, and the like; unsaturated esters of carboxylic acids, e. g., vinyl acetate; polymerizable ethylenically unsaturated hydrocarbons, e. g., styrene and the like. However, it is necessary that the internally deposited polymer essentially consist of the above defined quaternary ammonium vinylidene monomers in combined form.

The amounts of solely internally deposited polymer can vary from as low as 1% to as high as 200% or higher by weight of the starting cellulose. However, as illustrated by the examples, the internally deposited quaternary ammonium polymer should be at least about 5% by weight of the cellulose for the modified products to exhibit appreciably different properties. Because of the greater improvement in hydrophilic properties exhibited, those modified celluloses are preferred wherein at least 25% by weight of the cellulose of quaternary ammonium vinylidene polymer is internally deposited.

The internal deposition in cellulose, according to the process of this invention, of appreciable quantities of polymers of quaternary ammonium vinylidene monomers renders the thus treated cellulose extremely more hydrophilic in nature but, surprisingly, does not change any of the desirable characteristics of the cellulose, particularly the softness of the hand and feel. This latter is particularly surprising in the light of the previous art on the results of treating cellulose with vinylidene monomers and polymers. The thus treated cellulose is excellent for blending purposes with the synthetic film- and fiber-forming polymers, conferring improved hydrophilic properties to the blends at relatively low concentrations. Special effects can be achieved in the treated celluloses by using particular types of quaternary ammonium monomers, for instance, flameproofing through use of quaternary monomers containing high proportions of halogen or by interchanging the simple acid anion of an internally deposited quaternary polymer with a polytungstic acid, or fungicidal properties, particularly important in cellulose in sponge form, through use of quaternary ammonium monomers carrying benzyl substituents.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process which comprises impregnating cellulose with a solution of a polymerizable monomeric quaternary ammonium salt containing a vinylidene group, said solution further containing in solution an initiator for the addition polymerization thereof, polymerizing the impregnated monomer in situ in the cellulose, and extracting the cellulose impregnated with the polymer with a solvent for the latter until the polymer is removed from the surface.

2. Process which comprises impregnating cellulose with a solution of a polymerizable vinylidene monomer containing a quaternary ammonium salt group, said solution further containing in solution an initiator for the addition polymerization thereof, polymerizing the impregnated monomer in situ in the cellulose, extracting the cellulose impregnated with the polymer with a solvent therefor until the polymer is removed from the surface.

3. Process which comprises impregnating cellulose with an aqueous solution of a polymerizable monomeric quaternary ammonium salt containing a vinylidene group, said solution further containing in solution an initiator for the addition polymerization thereof, polymerizing the impregnated monomer in situ in the cellulose, washing the cellulose impregnated with the polymer with water until the polymer is removed from the surface.

4. Process which comprises impregnating cellulose with an aqueous solution of a polymerizable vinylidene monomer containing a quaternary ammonium salt group, said solution further containing in solution an initiator for the addition polymerization thereof, polymerizing the impregnated monomer in situ in the cellulose, washing the cellulose impregnated with the polymer with water until the polymer is removed from the surface.

5. Process of claim 4 wherein the vinylidene monomer has a single vinylidene group bonded through an electron attractive group to the quaternary ammonium nitrogen.

6. Process of claim 4 wherein the vinylidene monomer is selected from the class consisting of C-vinyl-N-substituted pyridinium compounds and ammonium compounds wherein the nitrogen in the cation is bonded to three hydrocarbon radicals and to the alkylene radical of a group, vinylidene-$(CO)_n$O alkylene-, $n$ being a cardinal number not greater than one.

7. Process of claim 4 wherein the quaternary ammonium nitrogen of the vinylidene monomer is bonded to three hydrocarbon radicals and to the radical $C_nH_{2n}$, $n$ being an integer not greater than 6, of a vinylidene-$(CO)_m$—$OC_nH_{2n}$-group, $m$ being a cardinal number not greater than 1.

8. Process which comprises impregnating cellulose with an aqueous solution of a methacryloxyalkyltrialkylammonium salt of a simple acid of molecular weight less than 150, said soltuion further containing in solution an initiator for the polymerization thereof, polymerizing the impregnated monomeric quaternary ammonium salt in situ in the cellulose, and washing the cellulose impregnated with the polymer until the polymer is removed from the surface.

9. Cellulose having a solely internal deposit of a vinylidene polymer, non-extractable from the cellulose by solvents for said polymer, having, external to the vinylidene polymer chain, quaternary ammonium salt groups, the anion of which is of molecular weight less than 150.

10. Cellulose having a solely internal deposit of a vinylidene polymer, non-extractable from the cellulose by solvents for said polymer, having, external to the polymer chain, quaternary ammonium salt groups, said polymer when apart from the cellulose being water soluble.

11. Cellulose having a solely internal deposit of a vinylidene polymer, non-extractable from the cellulose by solvents for said polymer, having, external to the polymer chain, quaternary ammonium salt groups, the anion of which is of molecular weight less than 150.

12. Cellulose having a solely internal deposit of a vinylidene polymer, non-extractable from the cellulose by solvents for said polymer, having, external to the polymer chain, quaternary ammonium salt groups, the anion of which is of molecular weight less than 150, the quaternary ammonium satl group being bonded to the polymer chain through an electron attractive group.

13. Cellulose having a solely internal deposit of a vinylidene polymer, non-extractable from the cellulose by solvents for said polymer, having, external to the polymer chain, quaternary ammonium salt groups, the anion of which is of molecular wieght less than 150, said polymer being that of a monomer selected from the class consisting of C-vinyl-N-substituted pyridinium compounds and ammonium compounds wherein the nitrogen in the cation is bonded to three hydrocarbon radicals and to the alkylene radical of a group, vinylidene-$(CO)_n$O alkylene-, $n$ being a cardinal number not greater than one.

14. Cellulose having a solely internal deposit of a vinylidene polymer, non-extractable from the cellulose by solvents for said polymer, having, external to the polymer chain, quarternary ammonium salt groups, the anion of which is of molecular weight less than 150, said polymer having its units essentially of a quaternary ammonium vinylidene monomer wherein the quaternary ammonium nitrogen of the vinylidene monomer is bonded to three hydrocarbon radicals and to the radical $C_nH_{2n}$, $n$ being an integer not greater than 6, of a vinylidene-$(CO)_m$—$OC_nH_{2n}$-group, $m$ being a cardinal number not greater than one.

15. Cellulose having a solely internal deposit, non-extractable from the cellulose by solvents for said polymer, of a polymeric methacrylyloxyalkyltrialkylammonium salt of a simple acid, the monomer of which is water soluble.

References Cited in the file of this patent

UNITED STATES PATENTS

| | | |
|---|---|---|
| 2,138,763 | Graves | Nov. 29, 1938 |
| 2,334,236 | Arnold et al. | Nov. 16, 1943 |
| 2,484,420 | Minsk | Oct. 11, 1949 |
| 2,487,829 | Richards | Nov. 15, 1949 |
| 2,563,289 | Steinman | Aug. 7, 1951 |
| 2,618,575 | Oswin | Nov. 18, 1952 |

OTHER REFERENCES

"Modern Plastic," September 1947, pp. 130–132 and 220–260–88.3.